United States Patent [19]

Yamashita et al.

[11] Patent Number: 4,864,095
[45] Date of Patent: Sep. 5, 1989

[54] APPARATUS FOR ASSEMBLING A MESH RING FOR A CATALYTIC CONVERTER

[75] Inventors: Sachihiro Yamashita; Masayuki Enomoto; Tadashi Goto, all of Sayama, Japan

[73] Assignee: Honda Giken Kogyo Kabushiki Kaisha, Tokyo, Japan

[21] Appl. No.: 225,453

[22] Filed: Jul. 28, 1988

[30] Foreign Application Priority Data

Jul. 28, 1987 [JP] Japan ................................. 62-188532
Jul. 28, 1987 [JP] Japan ................................. 62-188532

[51] Int. Cl.⁴ ............................................. B23K 11/32
[52] U.S. Cl. .................................. 219/86.24; 29/428; 219/86.25
[58] Field of Search .................. 219/86.1, 86.23, 86.24, 219/86.25; 29/33 E, 428

[56] References Cited

U.S. PATENT DOCUMENTS

| | | | |
|---|---|---|---|
| 4,667,386 | 5/1987 | Enomotot et al. | 29/157 R |
| 4,689,464 | 8/1987 | Levine | 219/86.24 |
| 4,738,013 | 4/1988 | Yamashita et al. | 29/157 R |

Primary Examiner—Clifford C. Shaw
Attorney, Agent, or Firm—Armstrong, Nikaido, Marmelstein, Kubovcik & Murray

[57] ABSTRACT

An apparatus for assembling a tubular mesh ring annularly interposed between a tubular casing in a catalytic converter and a columnar catalyst unit inserted therein, the mesh ring alternately having a plurality of crests and roots extending incliningly with respect to an axis of the catalyst unit when mounted to the converter, the assembling apparatus comprising a pair of side receiving members for supporting the sides of the mesh plate with an overlapped portion of the mesh tube positioned on top and the axis thereof oriented to be substantially horizontal, a lower receiving member for supporting the lower portion thereof, an upper receiving member for supporting the overlapped portion from below, an electrode secured to the upper surface of the upper receiving member and capable of bearing against the overlapped portion from below, a pressing plate for urging the overlapped portion against the electrode, and an electrode tip in cooperation with the electrode to spot-weld the overlapped portion of the mesh tube to assemble the mesh ring.

4 Claims, 6 Drawing Sheets

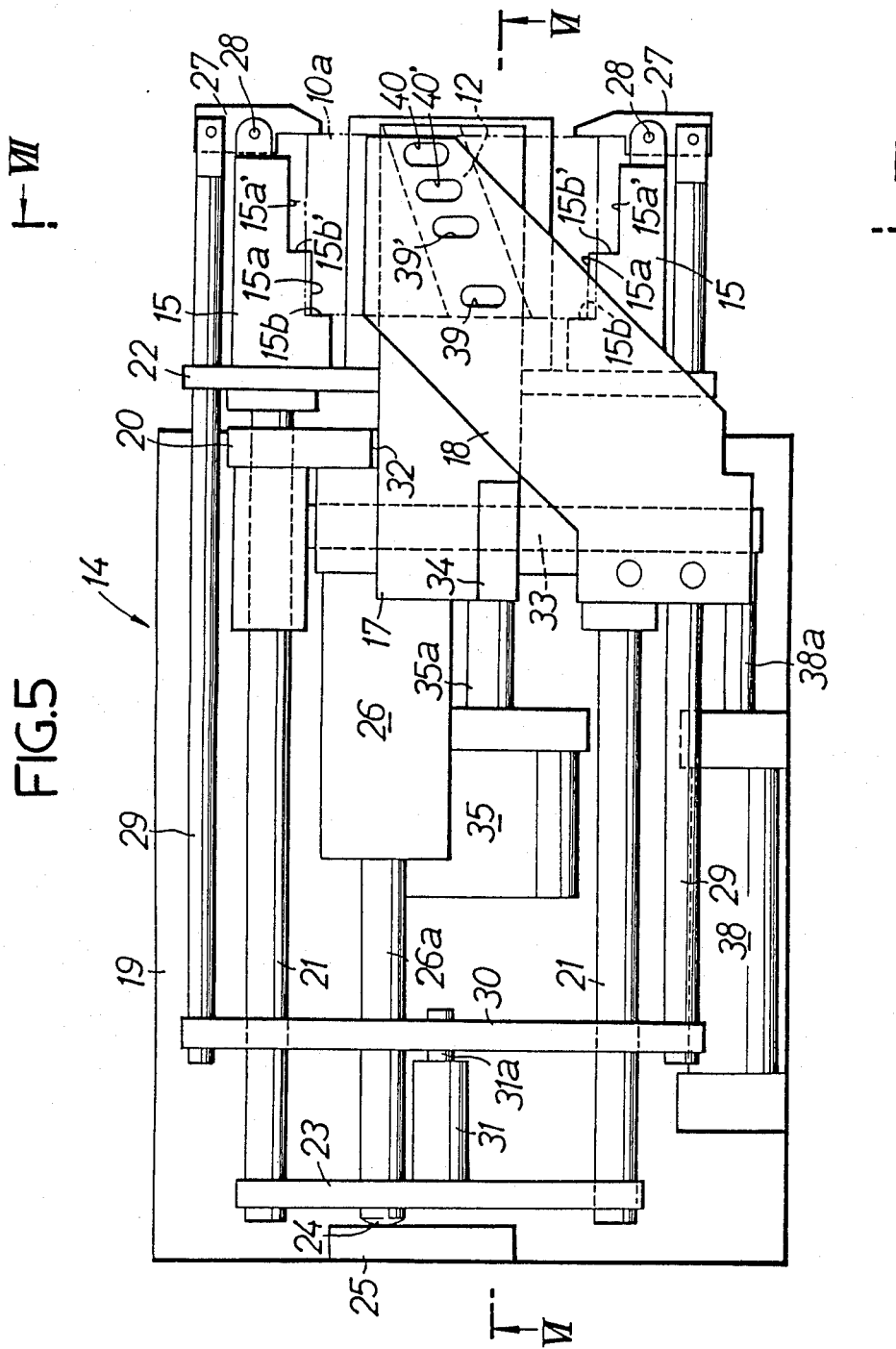

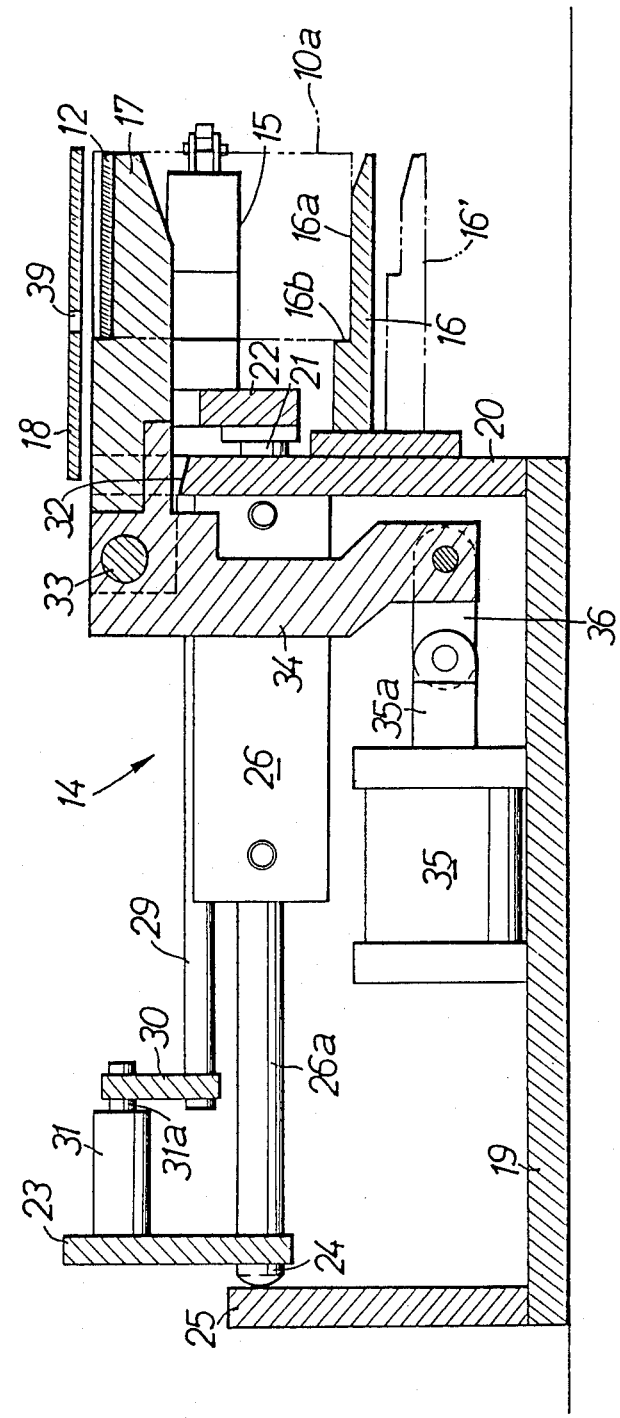

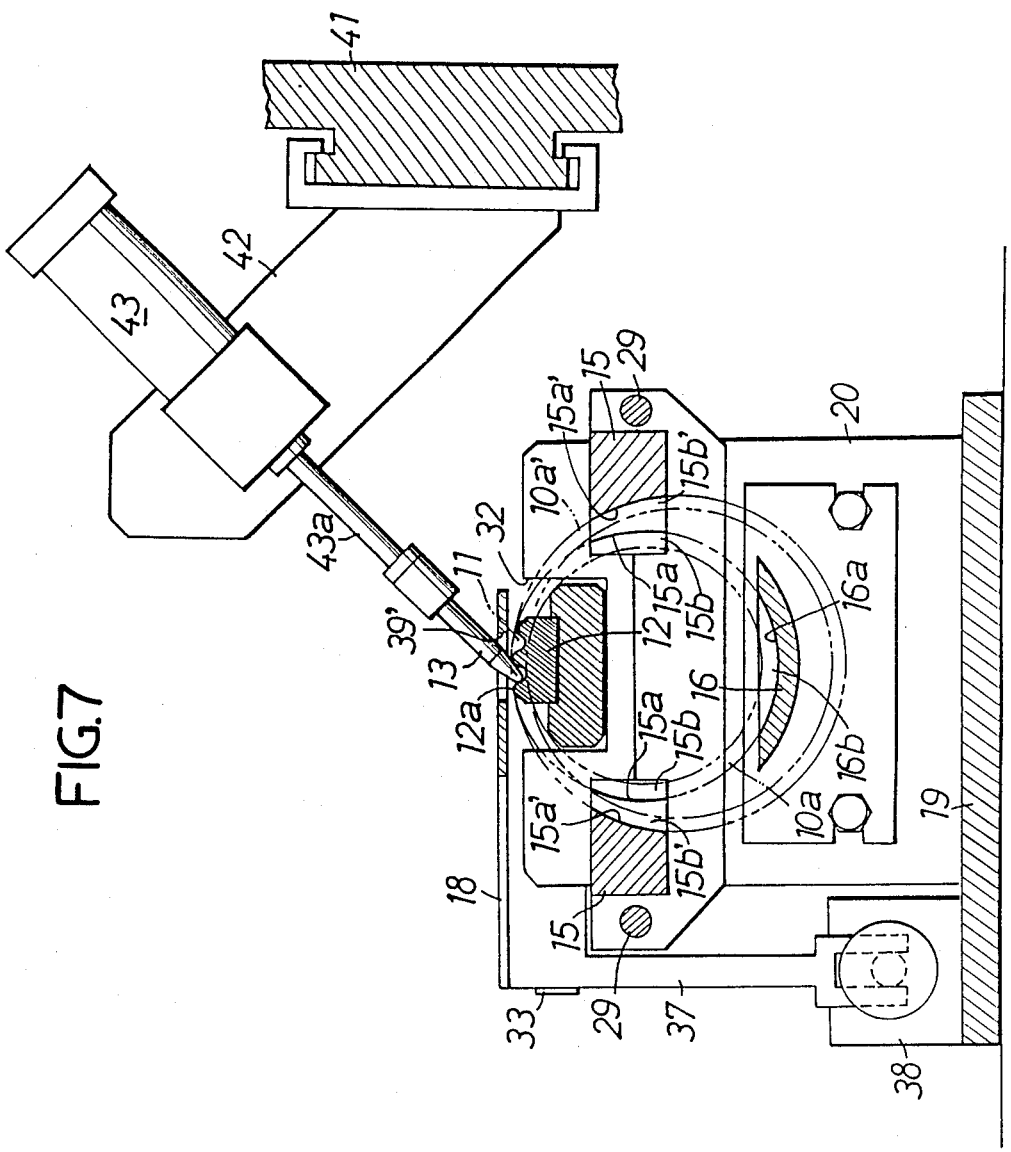

4,864,095

APPARATUS FOR ASSEMBLING A MESH RING FOR A CATALYTIC CONVERTER

BACKGROUND OF THE INVENTION

1. Field of the Invention

The present invention relates to an apparatus for assembling a mesh ring for a catalytic converter, which is to be annularly interposed between a columnar catalyst unit inserted into a casing basically formed in the form of a tube and the casing, having a tubular configuration to cover the catalyst unit and alternately having crests and roots extending in a direction inclined with respect to an axis of the catalyst unit so as to have a wavy form surface.

2. Description of the Prior Art

In the past, a mesh ring already in the form of a tube was brought into an assembly site of a catalytic converter, and the catalyst unit is fitted into the mesh ring. However, since the tubular mesh ring is formed to have wavy surface, there is a problem in that the mesh ring is bulky during transportation. In order to solve this problem, the mesh ring may be transported in the form of a flat plate to the assembly site of the catalytic converter and then assembled into a tubular form at the assembly site. However, no proposal has been heretofore made in which a mesh plate having crests and roots and formed into a wavy form surface is easily assembled into a tubular form.

SUMMARY OF THE INVENTION

The present invention has been accomplished in view of the aforementioned circumstances. It is an object of the present invention to provide an apparatus for assembling a mesh ring for a catalytic converter in which a mesh plate is tubularly assembled to easily form a mesh ring.

To accomplish the above object, according to the present invention, there is provided an apparatus for assembling a mesh ring for a catalytic converter, which comprises a pair of side receiving members fixedly arranged on opposite sides of a tubular mesh plate to support the sides of the tubular mesh plate obtained by rolling up a mesh plate in the form of a flat plate alternately having a plurality of crests and roots, in a posture wherein an overlapped portion of the side edges is positioned on top and an axis of the tubular mesh plate is substantially horizontal; a lower receiving member fixedly arranged to support a lower portion of the tubular mesh plate; an upper receiving member for supporting the overlapped portion from below; an electrode secured to the upper surface of the upper receiving member which bears against the overlapped portion from below; a pressing plate which is movable up and down above the overlapped portion to urge the overlapped portion against the electrode; and an electrode tip arranged to cooperate with the electrode to spot-weld the overlapped portion.

According to the apparatus of the present invention, when the rolled up tubular mesh plate is supported by both of the side receiving members, the lower receiving member and the upper receiving member, the tubular mesh plate is held in position by the pressing plate on the electrode and spot-welding is applied thereto by the electric tip and the electrode. The mesh ring can be easily assembled. Further, the mesh plate can be transported in the form of a flat plate to the assembly site for assembly to reduce the cost of transportation and reduce the storage space required.

Moreover, if concavo-convex portions corresponding to the crests and roots of the overlapped portion are provided in the upper surface of the electrode, the overlapped portion can be positively positioned on the upper surface of the electrode.

Furthermore, if a design is made so that the lower receiving member is replaceable depending on the kind of the tubular mesh plate, plural kinds of mesh rings different in size or the like can be assembled by a single apparatus.

The above and other objects, features and advantages of the invention will become apparent from the following detailed description of preferred embodiments taken in conjunction with the accompanying drawings.

BRIEF DESCRIPTION OF THE DRAWINGS

The drawings show one embodiment of the present invention wherein:

FIG. 5 is a plan view of one embodiment of an assembling apparatus according to the present invention;

FIG. 6 is a sectional view taken along the line VI—VI of FIG. 5; and

FIG. 7 is a sectional view taken along the line VII—VII of FIG. 5.

DETAILED DESCRIPTION OF THE PREFERRED EMBODIMENT

Figure 1:
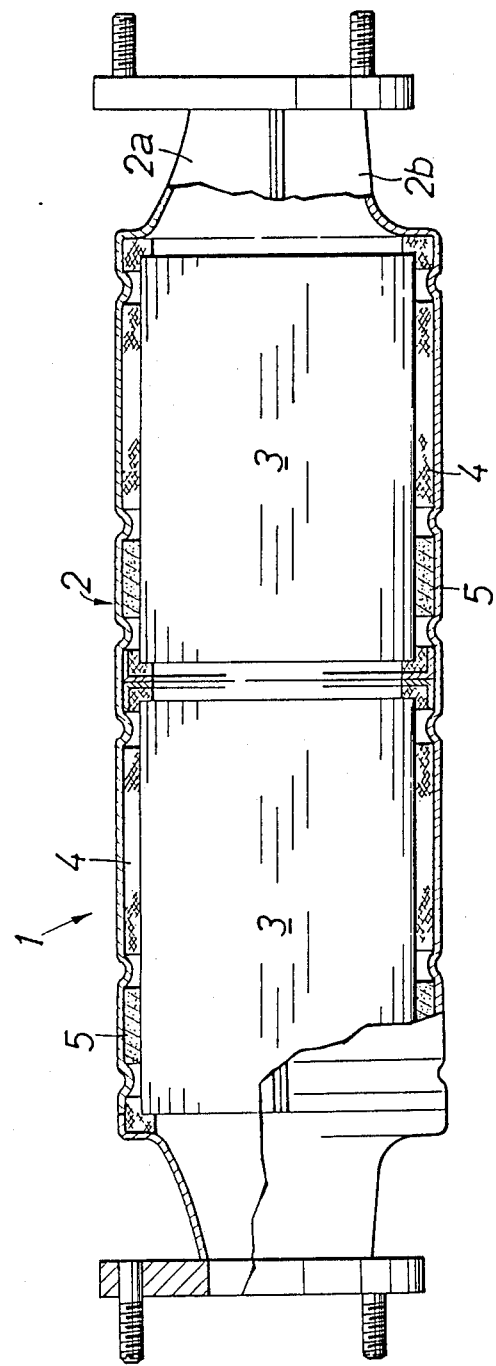
FIG. 1 is a vertical sectional view of a catalytic converter.

One embodiment of the present invention will be described hereinafter with reference to the accompanying drawings. Referring first to FIG. 1, a catalytic converter 1 is mounted, for example, in an exhaust system of an internal combustion engine for a vehicle and includes a casing 2 in which a pair of catalyst units 3 are contained and arranged. Each of the catalyst units is formed in a columnar shape, for example, having a circular cross-section. A pair of such catalyst units are axially arranged in a spaced relation.

The casing 2 is tubular in shape having a circular cross-section and is formed by connecting together a pair of casing halves 2a and 2b. A mesh ring 4 for preventing the destruction of the catalyst unit 3 due to vibration and a seal mat 5 for preventing the gas from passing between the catalyst unit 3 and the casing 2 are annularly interposed between the inner surface of the casing 2 and each of the catalyst units 3. The mesh ring 4 is formed into a tubular shape having a circular cross-section corresponding to the outer surface of the catalyst unit 3. The catalyst unit 3 is fitted into the mesh ring 4. The seal mat 5 is wound about the outer periphery of the catalyst unit 3 adjacent one end thereof.

Figure 2:
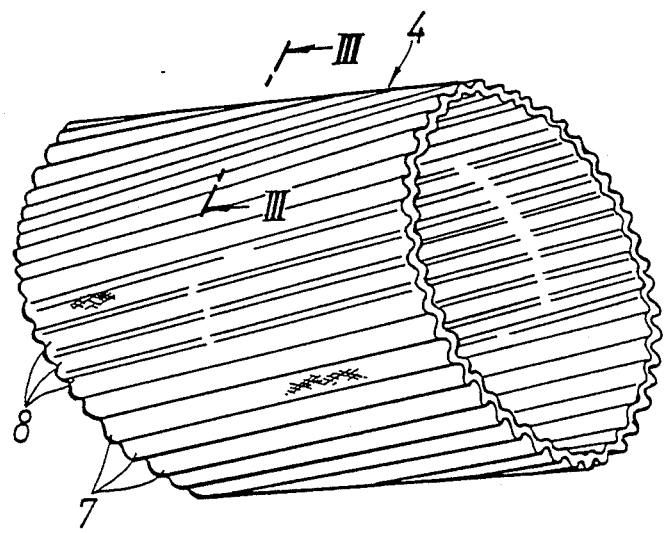
FIG. 2 is a perspective view of a mesh ring.
Figure 3:
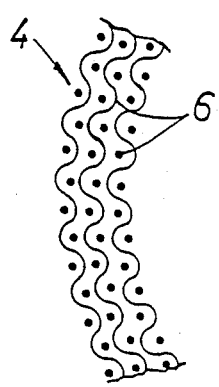
FIG. 3 is a sectional view taken along the line II—II of FIG. 2.

Referring to FIGS. 2 and 3, the mesh ring 4 is formed into a tubular shape obtained by laminating, for example, in three layers, a net of a knit fabric made, for example, from fine stainless steel wires 6. The mesh ring 4 is further formed into a wavy shape alternately having a plurality of crests 7 and roots 8 extending in a direction inclined with respect to the axis of the ring. By the employment of the wavy shape as described, the mesh ring 4 will have the necessary resiliency and will function to prevent the direct transmission of vibration from the casing to the catalyst units 3 and can prevent axial slipping within the casing 2.

Figure 4B:
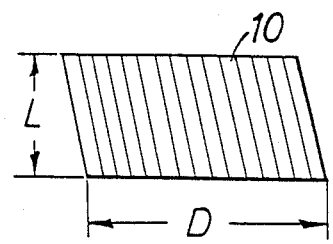
FIGS. 4(a) to 4(d), respectively, views for explaining the site of assembling a mesh ring.
Figure 4A:
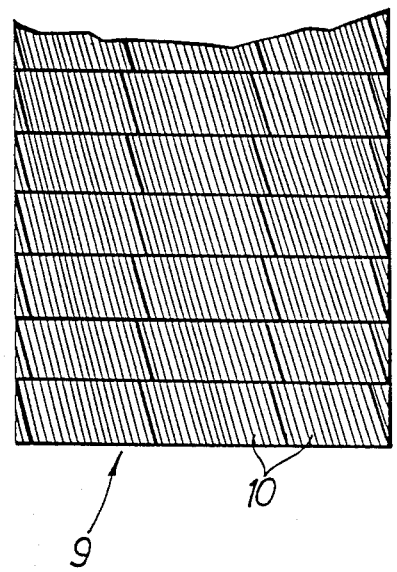

Referring to FIG. 4, in the assembly of the mesh ring 4 as described above, a mesh blank 9 in the form of a flat plate as shown in FIG. 4(a) is prepared. This mesh blank 9 is constructed by laminating in three layers a netlike member obtained by knitting together the fine wires 6, and is formed into a wavy plate alternately having the plurality of crests 7 and roots 8. A plurality of mesh plates 10 having a dimension required to form the mesh ring 4 are cut from the mesh blank 9 as shown in FIG. 4(b). That is, each of the mesh plates 10 is cut in such a manner that both axial ends thereof are placed along the crests 7 or roots 8 to have a width D required to form the mesh ring 4 and have a length L corresponding to the desired axial length of the mesh ring 4.

Figure 4C:
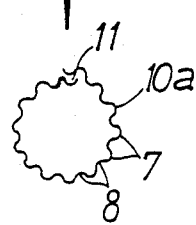
Figure 4D:
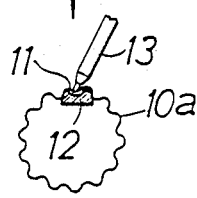

Further, each of the mesh plates 10 is rolled up as shown in FIG. 4(c). The crests 7 or roots 8 at both peripheral ends thereof are superposed to each other to form a mesh tube 10a. The overlapped portion 11 is placed on an electrode 12 as shown in FIG. 4(d). The overlapped portion 11 is then held under pressure between an electrode tip 13 an the electrode 12 and is spot-welded to complete the assembly of the mesh ring 4.

Next, an assembling apparatus 14 for assembling the mesh ring 4 will be described in detail while referring to FIGS. 5, 6 and 7. In this assembling apparatus 14, spot-welding is carried out on the mesh tube 10a rolled up as shown in FIG. 4(c).

The assembling apparatus 14 comprises a pair of side receiving members 15, 15 for supporting the sides and one axial end of the rolled up mesh tube 10a in a tubular shape with the overlapped portion 11 being positioned on top and the axis of the tubular shape being oriented substantially horizontal. A lower receiving member 16 is provided for supporting the lower portion (i.e., the portion opposed to the overlapped portion 11) and one end of the mesh tube 10a. An upper receiving member 17 is provided for supporting the overlapped portion 11 from below. An electrode 12 is secured to the upper portion of the upper receiving member 17. A vertically movable pressing plate 18 is provided to urge the overlapped portion 11 against the electrode 12. An electrode tip 13 cooperates with the electrode 12 to spot-weld the overlapped portion 11 together.

A support plate 20 is arranged vertically on one end of a fixed base 19. The lower receiving member 16 is detachably secured to the outer facing surface of the support plate 20. The lower receiving member 16 has a circularly formed support surface 16a to support the lower portion of the mesh tube 10a and a shoulder 16b that is abutable against one axial end of the mesh tube 10a. Since the lower receiving member 16 is replaceable, a lower receiving member 16 corresponding in diameter and length to the mesh tube 10a desired is fixed to the support plate 20. For example, for making a mesh tube 10a' having a large diameter and a short length, a lower receiving member 16' as indicated by the dash-dotted contour lines in FIG. 6 can be fixed to the support plate 20.

A pair of rods 21, 21 which are substantially horizontal and parallel to each other axially movably extend through the support plate 20. The ends of the rods 21, 21 are connected by a moving plate 22 opposed outwardly to the support plate 20. The other ends of both rods 21, 21 are connected with each other by a connecting plate 23. A stopper 25 is arranged vertically at the other end of the base 19. A projection 24 projecting on the outer surface of the connecting plate 23 is arranged to abut the stopper 25. A first cylinder 26 having an axis parallel to the rods 21, 21 is supported and fixed to the inner side of the support plate 20. The foremost end of the piston rod 26a of the first cylinder 26 is connected to the connecting plate 23. Accordingly, the rods 21, 21, and the moving plate 22 move in response to the expanding or retracting operation of the first cylinder 26. When the first cylinder 26 is retracted, the moving plate 22 is moved away from the support plate 20 whereas when the first cylinder 26 is extended, the moving plate 22 is moved closer to the support plate 20.

The pair of side receiving members 15, 15 are fixedly mounted on the outer surface of the moving plate 22. These side receiving members 15, 15 support from both sides the mesh tube 10a or 10a' supported by the lower receiving member 16 or 16', and are respectively provided with a circular support surface 15a capable of bearing against the outer peripheral surface of the mesh tube 10a supported by the lower receiving member 16 and a shoulder 15b capable of bearing against one axial end of the mesh tube 10a, and a circular support surface 15a' corresponding to the mesh tube 10a' supported by the lower receiving member 16' and a shoulder 15b'.

Engaging pawls 27 are respectively rotatably supported at their intermediate portions by support shafts 28, 28 having a vertical axis on the foremost ends of both the side receiving members 15, 15. One end of each pawl 27 is engageable with the other axial end of the mesh tube plates 10a' or 10a. Drive rods 29, 29 extending parallel to the rods 21, 21 are connected to the other ends of the engaging pawls 27. The other ends of both drive rods 29, 29 are connected to each other by a connecting member 30. A second cylinder 31 having an axis parallel to the drive rods 29, 29 is supported and fixed to the connecting plate 23 which connects together the rods 21, 21. The foremost end of the piston rod 31a in the second cylinder 31 is connected to the connecting member 30. Accordingly, the drive rods 29, 29 axially move in response to the expanding or retracting operation of the second cylinder 31, and the engaging pawls 27, 27 are turnably driven about the support shafts 28, respectively. When the second cylinder 31 is extended, both engaging pawls 27, 27 are turnably driven in the direction of engaging the other axial end of the mesh tube 10a or 10a' whereas when the second cylinder 31 is retracted, both engaging pawls 27, 27 are turnably driven in the direction of releasing the engagement thereof with the mesh tube 10a or 10a'.

The support plate 20 is provided in its upper central portion with a rectangular notch 32 with an open top. The upper receiving member 17 extends parallel to the rods 21, 21 and is arranged in the notch 32. A shaft 33 is secured to the support plate 20 and extends in a horizontal direction at right angles to the rods 21, 21 at a position spaced apart from the inner surface of the plate 20. The base end of the upper receiving member 17 is rotatably supported on the shaft 33. The upper receiving member can thereby swing between a substantially horizontal position and an inclined position in which the foremost end is directed downward to come closer to the lower receiving member 16 or 16'. An upper end of a swinging member 34 extending vertically internally of the support plate 20 is secured to the base end of the upper receiving member 17. A third cylinder 35 having an axis parallel to the rods 21, 21 is supported and secured to the bed 19. The foremost end of a piston rod 35a of the third cylinder 35 is connected to the lower end of the swinging member 34 through a link 36. Accordingly, the upper receiving member 17 turns about the shaft 33 in response to the expanding operation of the third cylinder 35. When the third cylinder 35 is retracted, the upper receiving member 17 is inclined with the foremost end thereof directed downward.

The electrode 12 is secured to the upper foremost end of the upper receiving member 17. The upper surface of the electrode 12 is formed with wavy concavoconvex portions 12a corresponding to the crests and roots of the mesh tube 10a or 10a' so that upon receipt of the overlapped portion 11 of the mesh tube 10a or 10a', the crests 7 and roots 8 are fitted into the upper surface of the electrode 12 thereby fixedly positioning the overlapped portion.

The pressing plate 18 is supported at its base end on the shaft 33 so as to turn between a position at which the mesh tube 10a or 10a' with the overlapped portion 11 placed on the electrode 12 is urged by the foremost end thereof toward the electrode 12 and an upper position at which the urging is released. The upper end of a vertically extending link 37 is secured to the base end of the pressing plate. A fourth cylinder 38 having an axis parallel to the rods 21, 21 is supported and fixed onto the base 19. A piston rod 38a of the fourth cylinder 38 is connected to the lower end of the link 37. With this arrangement, when the fourth cylinder 38 is retracted, the pressing plate 18 is turnably driven about the shaft 33 in the direction of urging the overlapped portion 11 toward the electrode 12 whereas when the fourth cylinder 38 is extended, the pressing plate 18 is turnably driven upward.

The pressing plate 18 is bored at the foremost end thereof with two sets of a pair of insert holes 39, 40, 39', 40' for receiving the electrode tip 13 in order to apply spot-welding to the overlapped portion 11 at both axial ends of the two kinds of the mesh tube 10a and 10a' having different sizes.

The electrode tip 13 is disposed at the foremost end of a piston rod 43a in a fifth cylinder 43 supported and secured to a slider 42 movable along a guide rail 41 fixedly arranged to one side of the base 19. When the fifth cylinder 43 is extended, the electrode tip 13 can be inserted into each of the insert holes 39, 40; 39', 40' so that the tip 13 cooperates with the electrode 12 to spot-weld to the overlapped portion 11.

Description will now be made of the operation of this embodiment. In assembling the mesh ring 4, the mesh plates 10 cut from the mesh blank 4 are transported to the site where the catalytic converter 1 is assembled. Accordingly, the mesh ring will not be bulky as compared with the prior art wherein the mesh ring 4 itself is transported, thus facilitating the transporting and requiring less storage area.

The mesh plate 10 thus transported is rolled up into a mesh tube 10a or 10a', which is then assembled by the assembling apparatus 14. Here, the case where the mesh tube 10a is used and assembled will be first explained, in which case the lower receiving member 16 is secured to the support plate 20. Initially the pressing plate 18 is open upwardly and the engaging pawls 27 and 27 are also opened. Both sides and one axial end of the mesh tube 10a are positioned to be supported by the pair of side receiving members 15, 15 and the lower portion thereof is positioned to be supported by the lower receiving member 16. The overlapped portion 11 is placed on the electrode 12. Subsequently, the engaging pawls 27 and 27 are brought into engagement with the other axial end of the mesh tube 10a. The pressing plate 18 is turned downward and the overlapped portion 11 is urged against the electrode 12. At that time, since the upper surface of the electrode 12 is formed with the concavoconvex portions 12a corresponding to the crests 7 and roots 8 of the mesh tube 10a, the overlapped portion 11 is positively positioned.

When the positioning of the mesh tube 10a has been completed, the electrode tip 13 is inserted into the insert holes 39 and 40, and the spot welding along with the electrode 12 is carried out to assemble the mesh ring 4. The engaging state of the engaging pawls 27 and 27 is then released and the pressing plate 18 is opened upward, after which the upper receiving member 17 is inclined so that the foremost end is directed downward, and the moving plate 22 is moved to push out the mesh ring 4. Thereby, the mesh ring 4 having been already assembled falls down from the upper receiving member 17 and is ejected.

After termination of such operation as described above, the moving plate 22 is returned to its original position, and next assembling of the next mesh ring 4 using the next mesh tube 10a is started.

In assembling a mesh tube 10a', the lower receiving member 16' in place of the aforesaid lower receiving member 16 is secured to the support plate 20. An operation similar to that described above is effected whereby the mesh ring 4 is assembled. Accordingly, two kinds of mesh rings with different sizes can be assembled by a single apparatus by simply using the appropriate sized lower receiving member.

It will be obvious that the above-described apparatus can be modified so that more than two kinds of mesh rings may be assembled.

What is claimed is:

1. An apparatus for assembling a mesh ring annularly interposable between a basically tubular casing in a catalytic converter and a columnar catalyst unit inserted into said casing, said mesh ring being formed of a mesh plate in the form of a flat plate alternately having a plurality of wavy crests and roots rolled up into a tubular shape, said crests and roots being inclined with respect to an axis of said tubular shape, said apparatus for assembling said mesh ring comprising a pair of side receiving members fixedly arranged on opposite sides of a mesh plate, rolled up into a mesh tube of a tubular shape, to support the sides of said mesh tube in a posture wherein an overlapped portion of the tube is positioned on top and an axis of the mesh tube is substantially horizontal; a lower receiving member fixedly arranged to support a lower portion of the mesh tube; an upper receiving member for supporting said overlapped portion from below; an electrode secured to the upper surface of said upper receiving member which bears against said overlapped portion from below a pressing plate which is movable up and down above said overlapped portion to urge said overlapped portion against said electrode; and an electrode tip arranged to cooperate wit said electrode to spot-weld said overlapped portion.

2. An apparatus for assembling a mesh ring for a catalytic converter according to claim 1 wherein said electrode is provided on its upper surface with concavoconvex portions corresponding to the crests and roots of said overlapped portion.

3. An apparatus for assembling a mesh ring for a catalytic converter according to claim wherein said pressing plate is provided with a plurality of insert holes through which said electrode tip can be inserted.

4. An apparatus for assembling a mesh ring for a catalytic converter according to claim 1 wherein said lower receiving member is designed to be replaceable corresponding to the kind of the mesh tube.

* * * * *